US006929223B2

(12) United States Patent
Hancock et al.

(10) Patent No.: US 6,929,223 B2
(45) Date of Patent: Aug. 16, 2005

(54) AIR CUSHIONED GRIPPERS FOR ARTICLE HOLDERS

(75) Inventors: Dennis Hancock, Mountain Green, UT (US); Jeffrey D. Hancock, Uintah, UT (US)

(73) Assignee: Stearns Inc., Sauk Rapids, MN (US)

( * ) Notice: Subject to any disclaimer, the term of this patent is extended or adjusted under 35 U.S.C. 154(b) by 0 days.

(21) Appl. No.: 10/320,675

(22) Filed: Dec. 17, 2002

(65) Prior Publication Data

US 2004/0113041 A1 Jun. 17, 2004

(51) Int. Cl.[7] .............................. B62J 11/00; F16L 3/10
(52) U.S. Cl. ................... 248/74.2; 248/316.7; 224/461; 224/462; 224/913; 224/436; 224/440; 24/482; 24/561; 24/564; 211/64
(58) Field of Search ....................... 248/73, 74.2, 316.7, 248/538, 222.12, 534, 535, 316.2; 24/482, 532, 545, 561, 562, 563, 564; 224/436, 437, 440, 441, 459, 461, 462, 420, 913; 211/64; D8/395

(56) References Cited

U.S. PATENT DOCUMENTS

| 553,614 | A | | 1/1896 | Handloser |
| 1,008,604 | A | | 11/1911 | Lake |
| 2,220,234 | A | * | 11/1940 | Hadaway .................... 248/538 |
| 2,274,605 | A | | 2/1942 | Hoffmeister |
| 2,708,088 | A | | 5/1955 | Steinke |
| 2,947,052 | A | * | 8/1960 | Michalsky ................... 24/546 |
| 3,063,569 | A | | 11/1962 | Huber |
| 3,096,960 | A | | 7/1963 | Kinney |
| 3,237,899 | A | | 3/1966 | Lewis |
| 3,266,633 | A | | 8/1966 | Graebner |
| 3,294,247 | A | | 12/1966 | Norrington |
| 3,361,265 | A | | 1/1968 | Wernimont |

(Continued)

OTHER PUBLICATIONS

"Single Pack Rack®," *All Rite Products—Original ATV Gear*, http://www.allriteproducts.com/pr1.html, 1 page (Last printed Nov. 29, 2004).
"Pack Rack® Plus +," *All Rite Products—Original ATV Gear*, http://www.allriteproducts.com/prp1.html,1 page (Last printed Nov. 29, 2004).
"Double Pack Rack®," *All Rite Products—Original ATV Gear*, http://www.allriteproducts.com/pr2.html, 1 page (Last printed Nov. 29, 2004).
"Pack Rack® Flat," *All Rite Products—Original ATV Gear*, http://www.allriteproducts.com/pr1f.html, 1 page (Last printed Nov. 29, 2004).
"The Magnum Pack Rack®," *All Rite Products—Original ATV Gear*, http://www.allriteproducts.com/mpr1.html, 1 page (Last printed Nov. 29, 2004.)
"Graspur All Terrain Single," *All Rite Products—Original ATV Gear*, http://www.allriteproducts.com/AT1.html, 1 page (Last printed Nov. 29, 2004).
"Graspur All Terrain Double," *All Rite Products—Original ATV Gear*, http://www.allriteproducts.com/AT2.html, 1 page (Last printed Nov. 29, 2004).
"Tree Stand Pack Rack®," *All Rite Products—Original ATV Gear*, http://www.allriteproducts.com/TR1.html, 1 page (Last printed Nov. 29, 2004).
"All Terrain™ Treestand Rack," *All Rite Products—Original ATV Gear*, http://www.allriteproducts.com.ATT.html, 1 page (Last printed Nov. 29, 2004).

(Continued)

*Primary Examiner*—Jonathon Szumny
(74) *Attorney, Agent, or Firm*—Merchant & Gould P.C.

(57) ABSTRACT

An article holder comprising bifurcated arms extending upwardly from a base to receive and hold articles inserted downwardly into the holder within cushioning, resilient fingers extending inwardly from the bifurcated arms to engage the inserted article and wherein the fingers have incoming engagement surfaces connected, with an air space between, to exiting engagement surfaces.

13 Claims, 4 Drawing Sheets

U.S. PATENT DOCUMENTS

| | | | |
|---|---|---|---|
| 3,365,761 A | | 1/1968 | Kalvig |
| 3,701,436 A | | 10/1972 | Adams |
| 3,744,687 A | | 7/1973 | Oreck |
| 3,860,209 A | | 1/1975 | Stecker |
| 3,876,079 A | | 4/1975 | Elkins et al. |
| D238,228 S | | 12/1975 | Elkins et al. |
| 3,995,742 A | | 12/1976 | Austin et al. |
| 4,025,015 A | | 5/1977 | Kolic |
| 4,084,735 A | | 4/1978 | Kappas |
| 4,108,313 A | | 8/1978 | Bogar, Jr. |
| 4,247,030 A | | 1/1981 | Amacker |
| 4,262,385 A | | 4/1981 | Norman |
| 4,271,997 A | | 6/1981 | Michael |
| 4,325,484 A | | 4/1982 | Berry |
| 4,400,856 A | | 8/1983 | Tseng |
| 4,429,638 A | | 2/1984 | Licari |
| 4,450,989 A | | 5/1984 | Bogar, Jr. |
| 4,470,179 A | * | 9/1984 | Gollin et al. .................. 24/543 |
| 4,566,660 A | * | 1/1986 | Anscher et al. ............ 248/74.2 |
| 4,597,496 A | | 7/1986 | Kaplan |
| 4,599,920 A | | 7/1986 | Schmid |
| 4,630,982 A | | 12/1986 | Fenner |
| 4,691,887 A | | 9/1987 | Bessinger |
| 4,776,471 A | | 10/1988 | Elkins |
| 4,827,654 A | | 5/1989 | Roberts |
| 4,881,386 A | | 11/1989 | Glines |
| 4,915,273 A | | 4/1990 | Allen |
| 4,958,758 A | | 9/1990 | Tipple et al. |
| 4,991,723 A | | 2/1991 | Elkins |
| 5,078,279 A | | 1/1992 | Hancock et al. .............. 211/64 |
| 5,130,899 A | | 7/1992 | Larkin et al. |
| 5,275,367 A | | 1/1994 | Frye |
| 5,344,032 A | | 9/1994 | Ramsdell |
| 5,370,240 A | | 12/1994 | Hand |
| D357,802 S | | 5/1995 | Todd et al. |
| D371,137 S | | 6/1996 | Kriegh |
| 5,524,772 A | | 6/1996 | Simmons |
| D386,298 S | | 11/1997 | Hancock ..................... D3/218 |
| D386,304 S | * | 11/1997 | Hancock ..................... D3/262 |
| 5,706,990 A | | 1/1998 | Lahrson |
| D400,782 S | * | 11/1998 | Nakamura .................. D8/395 |
| 5,898,975 A | | 5/1999 | Hancock |
| 5,915,572 A | * | 6/1999 | Hancock ..................... 211/64 |
| 6,021,936 A | | 2/2000 | Savant |
| 6,142,349 A | | 11/2000 | Roberson |
| 6,216,986 B1 | * | 4/2001 | Kwilosz .................... 248/74.1 |
| 6,382,484 B1 | | 5/2002 | Savant |
| 6,457,618 B1 | | 10/2002 | Hancock et al. |
| D466,856 S | | 12/2002 | Gates et al. ............... D12/223 |
| D476,290 S | | 6/2003 | Gates et al. ............... D12/408 |
| 6,588,637 B2 | * | 7/2003 | Gates et al. ............... 224/546 |
| 6,637,707 B1 | | 10/2003 | Gates et al. ............... 248/224.7 |
| 6,789,712 B2 | | 9/2004 | Gates et al. ............... 224/401 |
| 6,793,109 B2 | | 9/2004 | Gates et al. ............... 224/401 |
| 2003/0042282 A1 | | 3/2003 | Gates et al. ............... 224/560 |
| 2003/0146364 A1 | | 8/2003 | Gates et al. ............... 248/534 |
| 2003/0168484 A1 | | 9/2003 | Gates et al. ............... 224/401 |
| 2004/0020954 A1 | | 2/2004 | Gates et al. ............... 224/442 |

OTHER PUBLICATIONS

"All Terrain™ Kickboat Rack," *All Rite Products—Original ATV Gear*, http://www.allriteproducts.com/ATM1.html, 1 page (Last printed Nov. 29, 2004).

"All Terrain™ Truck Taped Gun/Bow Rack," *All Rite Products—Original ATV Gear*, http://www.allriteproducts.com/tt1.html, 1 page (Last printed Nov. 29, 2004).

"All Terrain™ Truck Suction Cup Gun/Bow Rack," *All Rite Products—Original ATV Gear*, http://www.allriteproducts.com/ts1.html, 1 page (Last printed Nov. 29, 2004).

"ATV Seefari® Monopod," *All Rite Products—Original ATV Gear*, http://www.allriteproducts.com/asm.html, 1 page (Last printed Nov. 29, 2004).

"V–rest attachment for Seefari™," *All Rite Products—Original ATV Gear*, http://www.allriteproducts.com/vrs.html, 1 page (Last printed Nov. 29, 2004).

* cited by examiner

AIR CUSHIONED GRIPPERS FOR ARTICLE HOLDERS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to grippers for article holders that are commonly mounted on all terrain vehicles, off-road vehicles, snowmobiles, etc., so that the vehicle can conveniently carry objects such as long guns, tools, fishing poles and other gear.

2. Description of the Related Art

Operators of all terrain vehicles (ATV)s, off-highway vehicles and snowmobile often desire to transport gear that may not be easily packed in bags or will not conveniently rest on racks and to have such gear readily available for use. Various systems for supporting such gear in position extending across the outwardly extending portions of handle bars and front and rear racks of ATVs and snowmobiles have been proposed. Generally the systems proposed in the past have required use of upwardly extending mounting brackets secured to outward extensions of the handle bars or to the front and/or rear vehicle racks. The upwardly extending brackets are topped with article holders with bifurcated arms having inwardly extending down turned fingers. Such article holders are disclosed, for example, in U.S. Pat. No. 6,382,488.

OBJECTS OF THE INVENTION

It is an object of the present invention to provide an article holder for a bracket assembly that will securely mount on an ATV or similar vehicle. The bracket assembly extends upwardly from a portion of a vehicle to receive an adjustably positioned article holder that will securely and softly grip articles positioned therein.

Another object is to provide an article holder having fingers that will permit easy insertion of an article to be held; that will securely hold the inserted article during travel of an ATV and that will permit forceful removal of the article from the holding action of the fingers.

FEATURES OF THE INVENTION

Principal features of the invention include an article holder suitable for use with a variety of bracket assemblies. The article holder includes fingers projecting into and downwardly with respect to bifurcated arms of the article holder. The fingers are made to have angled incoming engaging surfaces that will readily collapse into a space provided therefore as an article is inserted into the article holder. Exiting engagement surfaces of the fingers collapse less readily into the provided space during withdrawal of articles from the article holder. The exiting engagement surfaces provide less slope to the withdrawing article than is encountered by the incoming engaging surfaces during insertion. Consequently, the insertion of an article into the article holder is relatively easy while much greater resistance is encountered during withdrawal of the article. The greater resistance results in secure holding of an article against inadvertent release from the article holder while still affording release of the article when the article is forcefully removed.

At least some of the fingers of the article holder include a downwardly sloped upper surface extending from the article holder wall and a less downwardly sloped lower surface. The upper and lower surfaces of these fingers are made from a common material of equal thickness and each project inwardly from a wall of the article holder to join at their innermost ends. Thus, the upper surface provides less resistance to insertion of an article into the article holder than the resistance provided by the lower surface during withdrawal of an article from the article holder. During insertion of an article into the article holder the lower surfaces of the fingers of the article holder collapse into the air space formed between upper and lower surfaces. During withdrawal of the article from the article holder the upper surfaces of the fingers collapse into the air space between upper and lower surfaces.

Other objects and features of the invention will become apparent to those skilled in the art to which the invention pertains from the following detailed description and drawings, disclosing what is presently contemplated as being the best mode of the invention.

DETAILED DESCRIPTION

Figure 1:
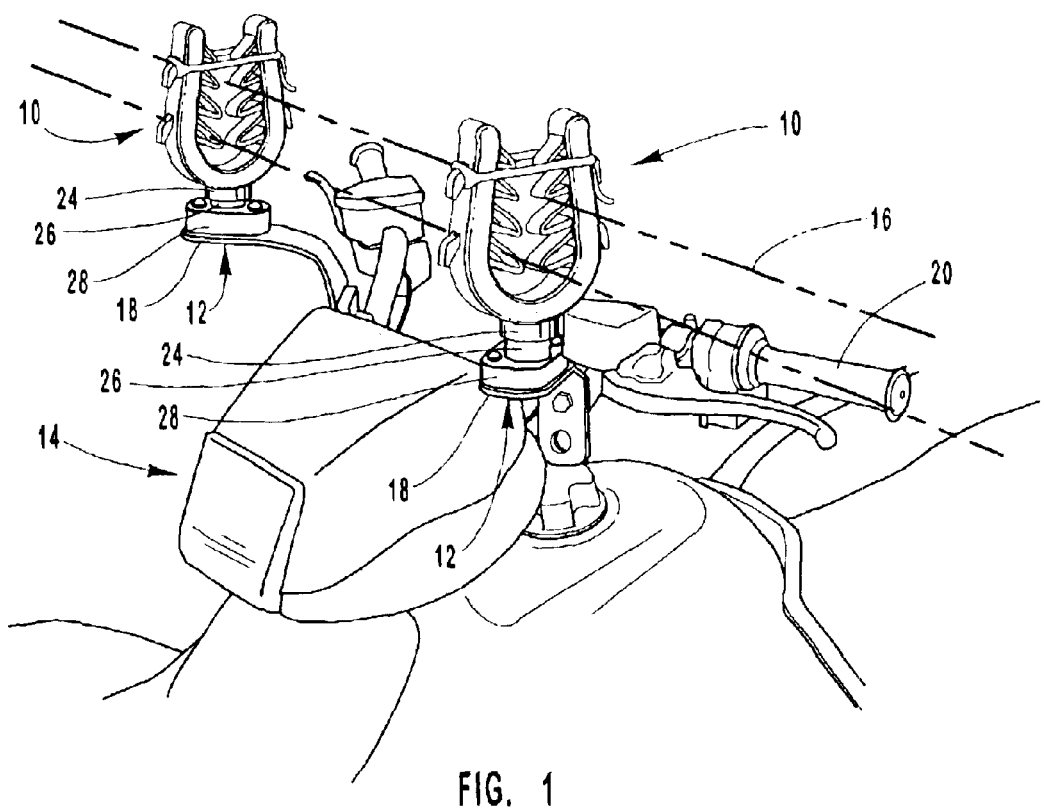
FIG. 1 is a perspective view of a pair of brackets mounted to upstanding portions of the handlebars of an ATV, shown fragmentarily and with article holders of the invention mounted on the brackets and with an article shown in phantom secured in the article holders.
Figure 2:
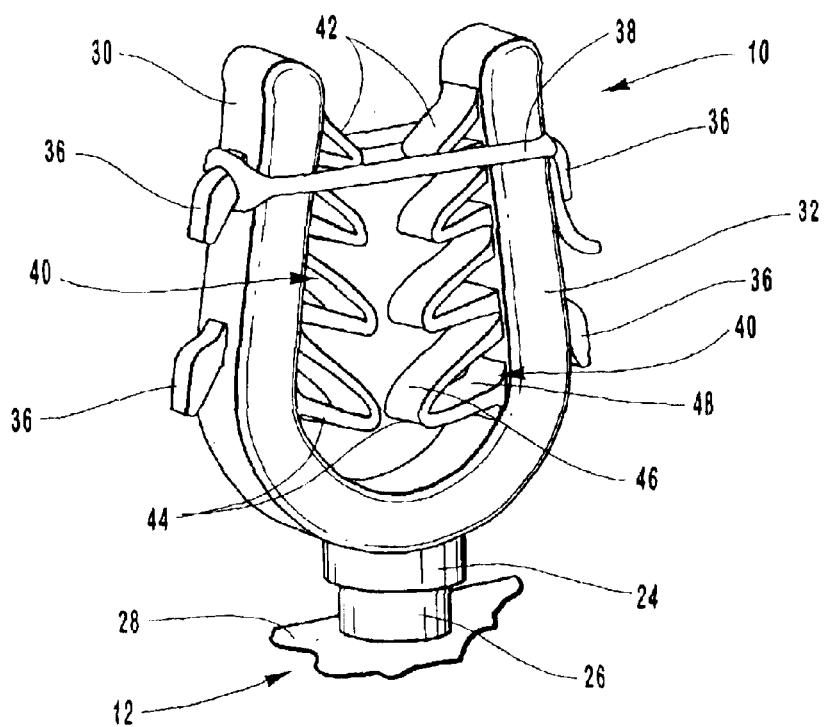
FIG. 2, an enlarged perspective view of a single bracket having article holders of the invention mounted on the bracket.
Figures 3A, 3B:
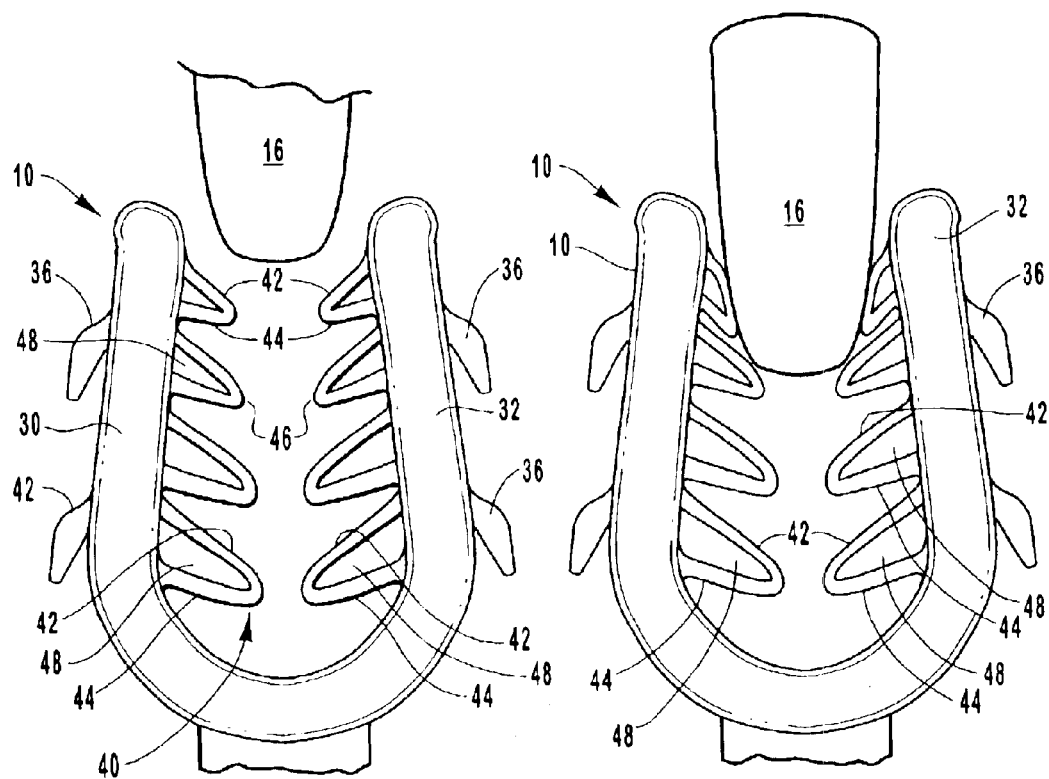
FIG. 3A, a front elevation view of an article holder of the invention, with an article, shown fragmentarily, ready for insertion into the article holder.
FIG. 3B, a view like that of FIG. 3A, but showing the article partially inserted into the article holder.
Figures 3C, 3D:
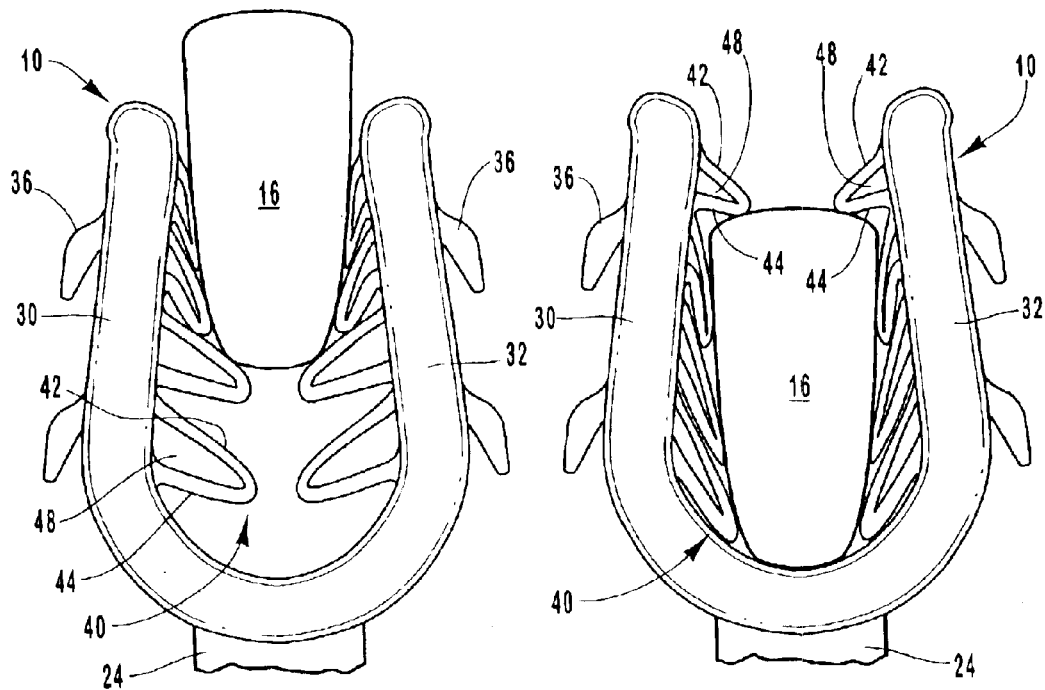
FIG. 3C, a view like that of FIGS. 3A and 3B, but with the article further inserted.
FIG. 3D, a view like that of FIGS. 3A, 3B, and 3C, but with the article fully inserted.

Referring now to the drawings:

In the illustrated preferred embodiment shown in FIGS. 1–3D, article holders of the invention, shown generally at 10, are mounted on a brackets assembly 12 secured to an all-terrain vehicle (ATV) 14 to receive and hold an article 16. The bracket assembly 12 includes a bar clamp 18 that provides means for mounting of the bracket assembly to an upwardly extending handlebar 20 of the ATV. It will be apparent that the bracket assembly could as well be mounted to other parts of the vehicle.

Each article holder 10 includes a mounting base 24 to fit over support shaft 26 of a bracket 28. Bifurcated arms 30 and 32 extend upwardly from mounting base 24, Hooks 36 project from outer sides of the arms 30 and 32 to receive an elastic band 38 should that be desired to more securely hold an article 16 in the article holder 10. A plurality of fingers 40 extend inwardly from each of the arms 30 and 32. The fingers preferably have a width corresponding to the width of the bifurcated arms. Each finger 40 includes a flexible incoming engaging upper surface 42 and a flexible exiting engaging lower surface 44. The surfaces 42 and 44 of each finger 40 are interconnected at their ends 46 remote from the bifurcated arms and have an air space 48 between them into which the surfaces collapse. Both surfaces 42 and 44 of each finger 40 are inclined downwardly from arms 30 and 32 but surfaces 42 are inclined at a steeper angle than surfaces 44. Surfaces 42 facilitate insertion of the object 16 and downward camming of the fingers 40 while surfaces 44 resist upward lifting of the fingers 40. Fingers 40 are resilient and conform to the shape of an inserted object 16 to provide a cushioned custom fit for the article.

Figure 4:
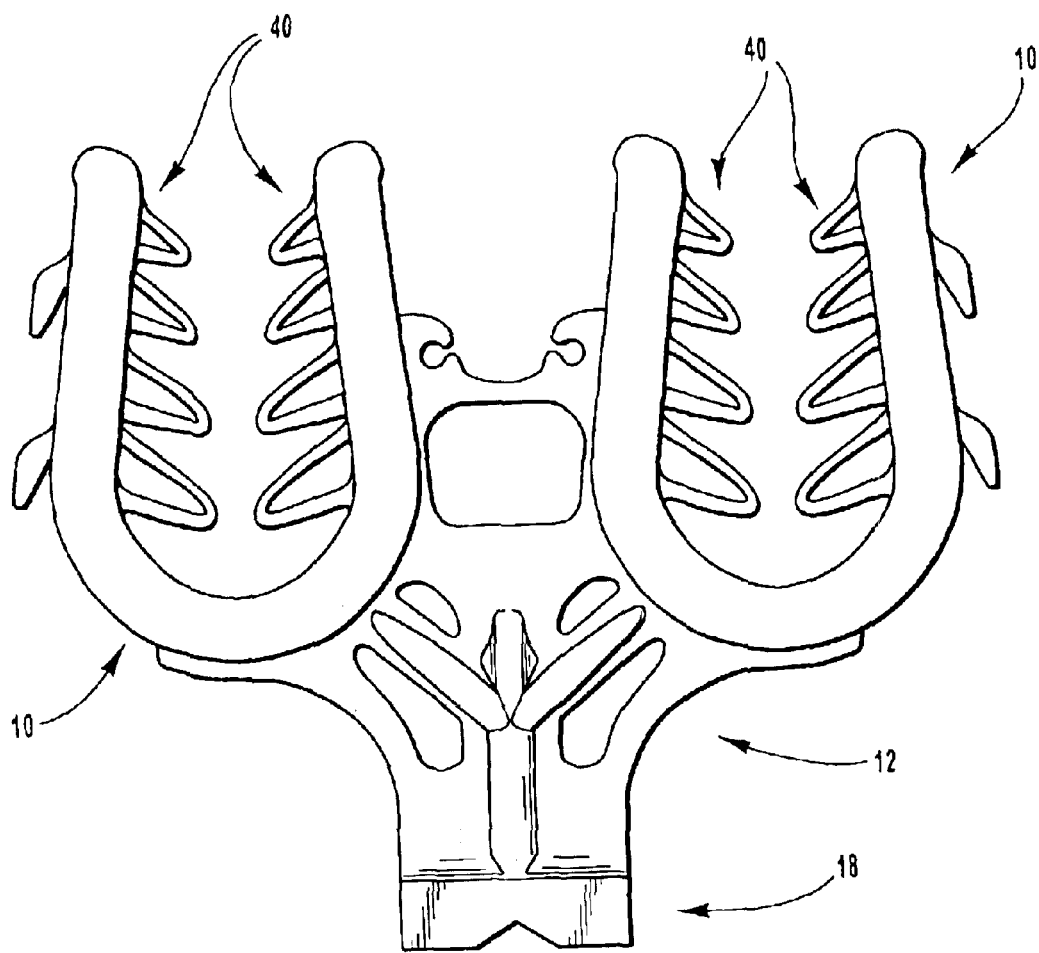
FIG. 4, a front elevation view showing a pair of article holders mounted on a bracket.

As shown in FIG. 4 a pair of article holders 10 having fingers 40 therein can be attached to a single bracket assembly 12 having a bar clamp 18.

Figure 5A:
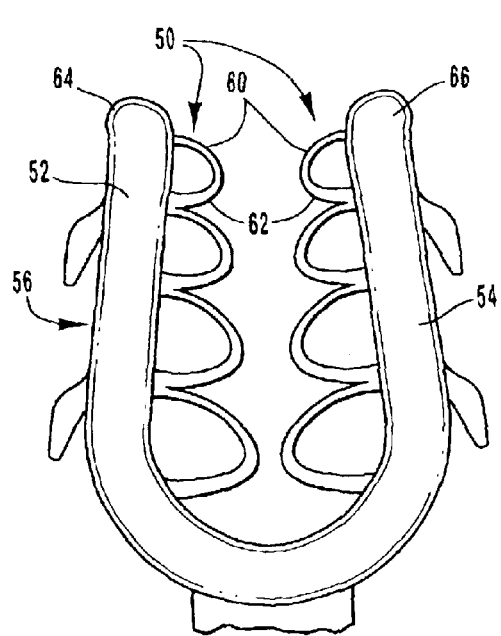
FIGS. 5A–5D, each showing a front elevation view like that of FIG. 4A of a different embodiment of fingers of the article holder of the invention.

In the embodiment of the invention shown in FIG. 5A fingers 50 project inwardly with respect to the bifurcated arms 52 and 54 of an article holder 56 of a bracket assembly 58, shown fragmentarily, and corresponding to the bracket assembly previously disclosed at 12. Each finger 50 is formed as a loop with an upper incoming engaging surface 60 that curves downwardly and into the space between the fingers and a lower exiting engaging surface 62 that extends from the upper surface substantially normal to the walls of the bifurcated arms 52 and 54. The fingers 50 are smaller at upper ends 64 and 66 of the arms 52 and 54 and are progressively larger as they are positioned downwardly in the space between the bifurcated arms. The difference in sizes of the fingers allows the article holder to better accommodate and securely hold articles 16 or different sizes and shapes with smaller articles more securely held in the bottoms of the article holders.

Figure 5B:
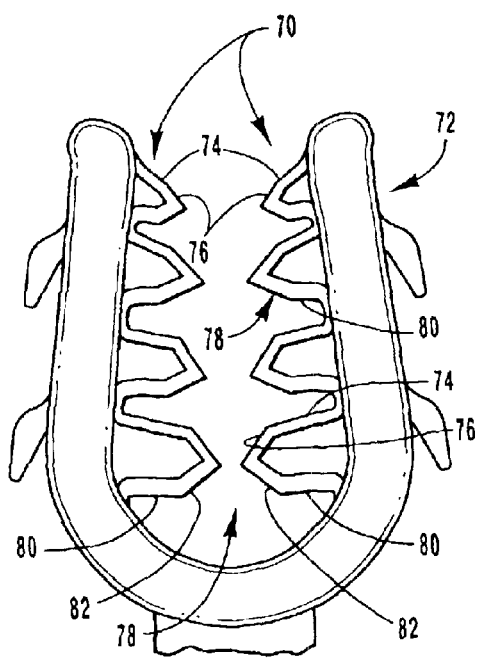

In the embodiment of FIG. 5B the fingers 70 of article holder 72 each have an upper incoming engaging surface 72 with dual slopes 74 and 76 and a lower exiting engaging surface 78 with dual slopes 80 and 82. The dual slopes of surfaces 72 and 78 make it easier to both insert an article 16 as the article is further inserted and to remove the article as the article is further removed.

Figure 5C:
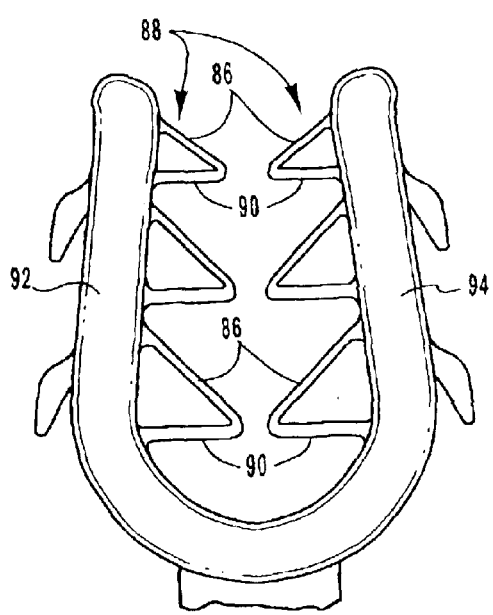

In the embodiment of FIG. 5C the incoming engagement surfaces 86 of fingers 88 are sloped inwardly and downwardly and the exiting engagement surfaces 90 extend substantially normal to the inner surfaces of the bifurcated arms 92 and 94 of the article holder 96. The surfaces 86 facilitate downward insertion of articles between the bifurcated arms and the surfaces 90 resist withdrawal of the articles.

Figure 5D:
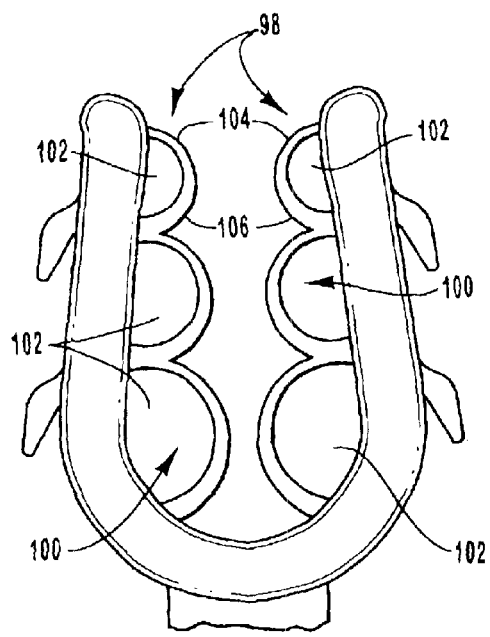

In the embodiment of FIG. 5D the fingers 98 are in the form of semi-circular loops 100 having an air space 1022 within each loop. Surfaces 104 of upper halves of the loops 90 serve as incoming engagement surfaces and the surfaces 108 of the lower halves of the loops 90 serve as exiting engagement surfaces. Fingers 98 are smaller at the upper ends of the bifurcated arms and are progressively larger towards the bottom connection of the bifurcated arms.

In all embodiments of the resilient fingers within the article holder of the invention the smaller fingers at the tops of the bifurcated arms and larger fingers at the bottoms of the bifurcated arms. Aair spaces between the incoming engaging surfaces provide cushioned side support for articles of all shapes inserted into the holder. The fingers conform to the shape of the article and the articles are easily inserted into the article holders to be securely held in place.

In embodiments of the invention, the bifurcated arms, as shown in the drawings, extend outwardly and upwardly, as oriented, from opposite sides of the base.

It will be apparent that more than one embodiment of finger can be used with the bifurcated arms of the holder of the invention, if desired.

Although preferred embodiments of our invention have been herein disclosed, it is to be understood that the present disclosure is by way of example and that variations are possible without departing from the subject matter coming within the scope of the following claims, which subject matter we regard as our invention.

We claim:

1. An article holder comprising
   a base including configured for attachment to a bracket assembly;
   bifurcated arms, spaced apart fixed to and extending from said base; and
   a plurality of resilient fingers projecting inwardly from an interior surface of each of said bifurcated arms, at least some of said fingers each including an upper incoming engagement surface connected at an first end to one of the bifurcated arms and connected at a second end to a first end of a lower exiting engagement surface, a second end of said lower exiting engagement surface being connected to the one of the bifurcated arms at a position closer to the base than a position of the first end of the incoming engagement surface, the incoming and exiting engagement surfaces defining an air space between said surfaces and the one of the bifurcated arms from which said finger projects;
   wherein at least a portion of the incoming and exiting engagement surfaces are substantially planar.

2. The article holder as in claim 1, wherein each incoming engagement surface extends inwardly and downwardly towards the base from the first end to the second end of the incoming engagement surface.

3. The article holder as in claim 1, wherein th exiting engagement surface extends upwardly away from the base from the first end to the second end of the exiting engagement surface.

4. An article holder as in claim 3, wherein at least some of the incoming engagement surfaces and the exiting engagement surfaces include two or more exposed surfaces, wherein each exposed surface is oriented at a different angle relative to the base.

5. The article holder as in claim 1, wherein the exiting engagement surface extends downwardly towards the base from the first end to the second end of the exiting engagement surface.

6. The article holder as in claim 1, wherein the fingers projecting inwardly from the bifurcated arms are spaced apart along the arms from an upper end of the arms towards the base, and the fingers are smaller at the upper ends of said arms and are progressively larger towards the base.

7. The article holder as in claim 1, wherein the first and second ends of the exiting engagement surface are positioned substantially equidistant from the base.

8. An article holder comprising a base including means for attachment to a bracket assembly;

bifurcated arms, spaced apart, fixed to and extending from said base; and a plurality of resilient fingers projecting inwardly from each of said bifurcated arms, at least some of said fingers each including an upper incoming engagement surface connected at one end to a lower exiting engagement surface between said arms, said fingers each having an air space formed between said surfaces and an interior surface of a bifurcated arm from which said finger projects, said upper incoming engagement surface extends inwardly and downwardly toward the base, said exiting engagement surface extending inwardly of said bifurcated arms, and at least one exiting engagement surface extends substantially normal to an interior surface of a bifurcated arm.

9. The article holder of claim 8, wherein at least a portion of at least one of the incoming and exiting surfaces is substantially planar.

10. An article holder comprising a base;

bifurcated arms extending from said base;

a plurality of resilient fingers projecting inwardly from each of said bifurcated arms, at least some of said fingers each including an upper incoming engagement surface connected at one end to a lower exiting engagement surface between said arms, and said some of said fingers each having an air space formed between said surfaces and an interior surface of a bifurcated arm from which said some of said fingers project, each said incoming engagement surface extending inwardly and downwardly toward the base, and each exiting engagement surface extending upwardly away from said base from its engagement with said incoming engagement surface.

11. The article holder as in claim 1, wherein at least one exiting engagement surface extends substantially normal to an interior surface of a bifurcated arm.

12. An article holder comprising a base including means for attachment to a bracket assembly;

bifurcated arms, spaced apart, fixed to and extending from said base; and a plurality of resilient fingers projecting inwardly from each of said bifurcated arms, at least some of said fingers each including an upper incoming engagement surface connected at one end to a lower exiting engagement surface between said arms, said fingers each having an air space between said surfaces and an interior surface of a bifurcated arm from which said finger projects, said upper incoming engagement surface extends inwardly and downwardly toward the base, said exiting engagement surface extending inwardly of said bifurcated arms, and wherein at least some of the incoming engagement surfaces and the exiting engagement surfaces have multiple sloped surface, and each of the multiple sloped surfaces is substantially planar.

13. An article holder, comprising:

a base;

bifurcated arms coupled to the base and defining an open upper end remote from the base and a inner space between the arms; and a plurality of resilient fingers projecting from each of the arms into the inner space, the fingers each including an upper engagement surface facing the open upper end and a lower engagement surface facing the base, the upper and lower engagement surfaces defining an air space between the upper and lower engagement surfaces and the arm from which the finger projects, wherein at least a portion of at least one of the engagement surfaces of the plurality of fingers is substantially planar.

\* \* \* \* \*